（12）United States Patent
Gong et al.

(10) Patent No.: US 8,732,615 B2
(45) Date of Patent: May 20, 2014

(54) UNIFIED INTERFACE FOR DISPLAY AND MODIFICATION OF DATA ARRAYS

(75) Inventors: ZhiYong Gong, Shanghai (CN); TianMin Huang, Shanghai (CN); Leo Chi-Lok Yu, Tsuen Wan (HK)

(73) Assignee: Business Objects Software Ltd., Dublin (IE)

( * ) Notice: Subject to any disclaimer, the term of this patent is extended or adjusted under 35 U.S.C. 154(b) by 745 days.

(21) Appl. No.: 12/628,907

(22) Filed: Dec. 1, 2009

(65) Prior Publication Data
US 2010/0318943 A1 Dec. 16, 2010

(30) Foreign Application Priority Data
Nov. 6, 2009 (CN) .......................... 2009 1 0211179

(51) Int. Cl.
*G06F 3/048* (2013.01)
(52) U.S. Cl.
USPC ........... 715/835; 715/810; 715/841; 715/853; 715/854
(58) Field of Classification Search
USPC .......................... 715/853, 810, 835, 854, 841
See application file for complete search history.

(56) References Cited

U.S. PATENT DOCUMENTS

| | | | | |
|---|---|---|---|---|
| 5,515,487 | A * | 5/1996 | Beaudet et al. | 345/440 |
| 6,289,501 | B1 * | 9/2001 | Mutschler, III | 717/114 |
| 6,633,308 | B1 * | 10/2003 | Ono et al. | 715/723 |
| 7,340,690 | B2 * | 3/2008 | Lau | 715/855 |

* cited by examiner

*Primary Examiner* — Andrey Belousov
(74) *Attorney, Agent, or Firm* — Schwegman, Lundberg & Woesser, P.A.

(57) ABSTRACT

In an embodiment, a method is provided for displaying data arrays in a graphical user interface. In this method, a first data array and a second data array are accessed. Here, the second data array is nested in the first data array. The first data array comprises first data elements and the second data array comprises second data elements. A hierarchical tree structure of the first and second data arrays is constructed where the first data array is ranked higher than the second data array in the hierarchical tree structure based on the nesting of the second data array in the first data array. An arrangement of the first and second data elements is displayed in the graphical user interface, where the arrangement is based on the hierarchical tree structure.

20 Claims, 11 Drawing Sheets

| Data Type | Graphical Gauge Control | Screenshot |
|---|---|---|
| String | Text Input | A |
| Number | Numeric Stepper | 12 |
| Boolean | Check Box / Combo Box | ☑ or True |
| Enumerable type | Combo Box | Label 1 |
| Color | Color Picker | |
| Date | Date Chooser | 12/25/2008 |

*FIG. 10*

UNIFIED INTERFACE FOR DISPLAY AND MODIFICATION OF DATA ARRAYS

CLAIM OF PRIORITY

The present application claims the priority benefit of the filing date of Chinese Application No. 200910211179.4 filed Nov. 6, 2009, the entire content of which is incorporated herein by reference.

COPYRIGHT

A portion of the disclosure of this document may include material that is subject to copyright protection. The copyright owner has no objection to the facsimile reproduction by anyone, of the patent document or the patent disclosure, as it appears in the Patent and Trademark Office patent files or records, but otherwise reserves all copyright rights whatsoever. The following notice applies to the software, data, and/or screenshots that may be illustrated below and in the drawings that form a part of this document. Copyright © 2009, SAP AG. All Rights Reserved.

FIELD

The present disclosure relates generally to information retrieval. In an embodiment, the disclosure relates to a unified interface for display and modification of data arrays.

BACKGROUND

Many software applications output a variety of data. For example, report creation applications generate reports that illustrate data and/or analysis of data. Various data sharing applications, for example, provide displays of data and analytics uploaded by other users. Many tools used in an integrated development environment also display various data used in software development. However, in many of these software applications, the outputted data cannot be modified or edited by a user. In examples where the outputted data can be modified, the software applications typically provide very limited support or functionalities for the display and modification of these outputted data.

BRIEF DESCRIPTION OF DRAWINGS

The present disclosure is illustrated by way of example and not limitation in the figures of the accompanying drawings, in which like references indicate similar elements and in which:

FIG. 10 depicts a table listing examples of the different user-defined GUIs in the form of graphical gauge controls that may be assigned to the different data types.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for providing a unified interface for the display and modification of data arrays. Here, a generic array editor application can retrieve data arrays from a variety of different sources and can generate a graphical user interface (GUI) of the data arrays for display. As explained in more detail below, an arrangement of the data arrays, as displayed in the GUI, can be based on a hierarchical tree structure. Additionally, through the use of the GUI, a user can modify the data array by, for example, adding, deleting, and editing data elements associated with the data arrays.

Figure 1:
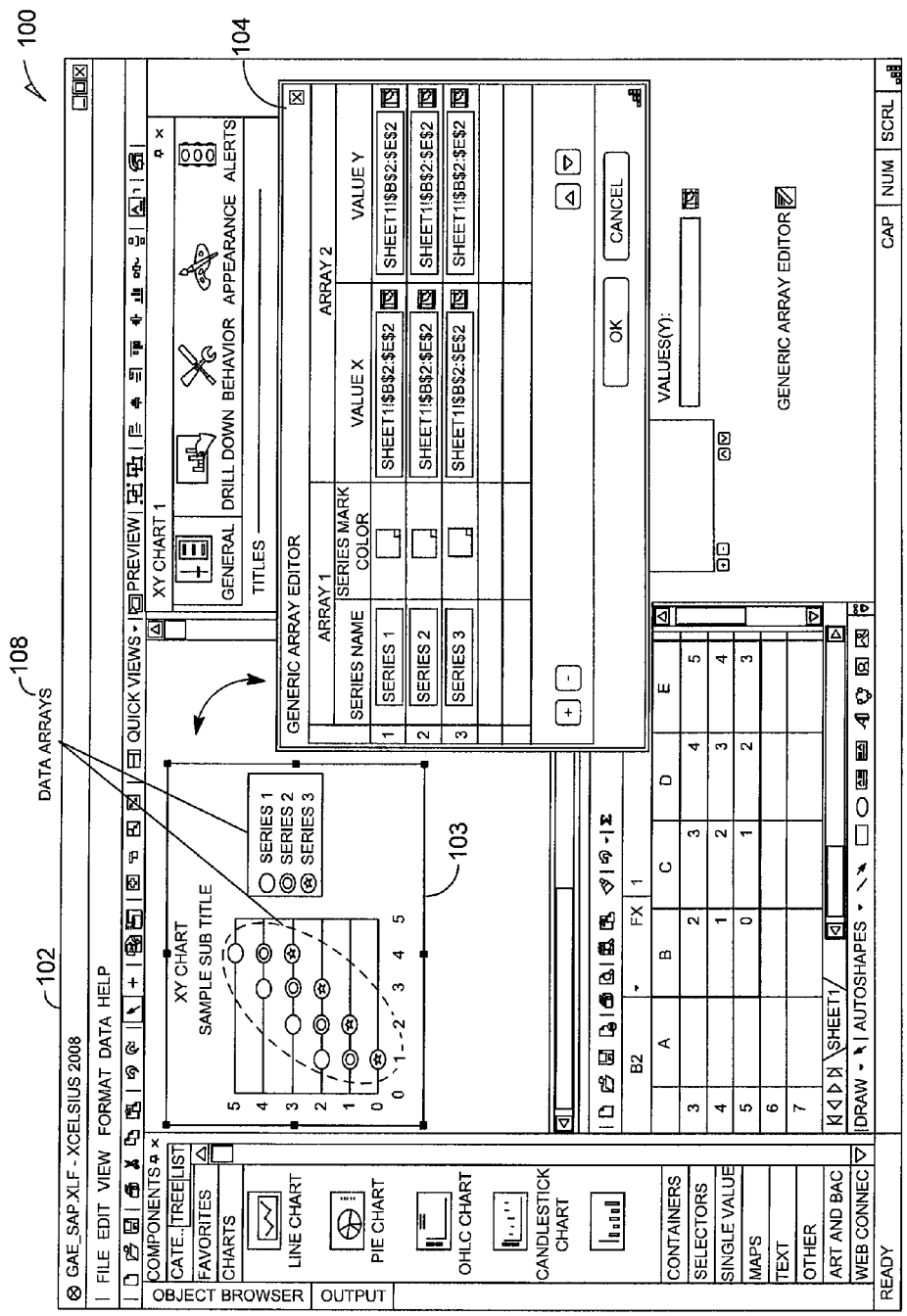
FIG. 1 depicts a user interface diagram, in accordance with an example embodiment, that is adapted to display a variety of data arrays.

FIG. 1 depicts a user interface diagram 100, in accordance with an example embodiment, that is adapted to display a variety of data arrays. The user interface diagram 100 includes a main GUI 102 and a generic array editor GUI 104. In this example, a particular application consolidates various metrics from different business applications and displays these metrics in the main GUI 102. The various metrics are stored in one or more data arrays. A "data array," as used herein, refers to a data structure that includes a collection or set of data elements (values or variables). A data array may be one-dimensional where, for example, it is a list of data elements. Alternatively, a data array may be multi-dimensional where, for example, each data element of the data array can include another data array. The main GUI 102 includes a chart region 103 that displays a plot of various X and Y values. In particular, the chart region 103 displays two multidimensional data arrays 108, where one multidimensional data array includes series names and series mark colors and the other multidimensional array includes X and Y values.

In this example, the particular application may not provide the capability to allow the modification of the metrics depicted in chart region 103, such as the series names, series mark colors, X values, and Y values. To modify these metrics, a user may call or execute a separate application, namely a generic array editor module, that allows the user to view and modify the metrics through the use of the generic array editor GUI 104. As used herein, it should be appreciated that "modify" refers to an addition of a new value, a deletion of an existing value, and/or editing of an existing value. In general, the generic array editor module accesses or extracts data arrays from different applications, and displays these data arrays in a GUI, such as the generic array editor GUI 104. This generic array editor GUI 104 displays data elements of the data arrays in a hierarchical tree structure, which is explained in more detail below, and provides functionalities for a user to delete and edit existing data elements and add new data elements by way of the generic array editor GUI 104.

For example, as depicted in FIG. 1, the generic array editor module accesses the data arrays 108 from the particular application that generates the main GUI 102, and displays data elements associated with the series name, series mark color, X value, and Y value. As explained in more detail below, the data elements may be arranged in the generic array editor GUI 104 based on a hierarchical tree structure. A user may also edit the series name, series mark colors, X values, and/or Y values using this generic array editor GUI 104. Accordingly, the generic array editor module may be used to facilitate the modification (and display) of metrics generated by an application that does not provide such modification functionalities.

Figure 2:
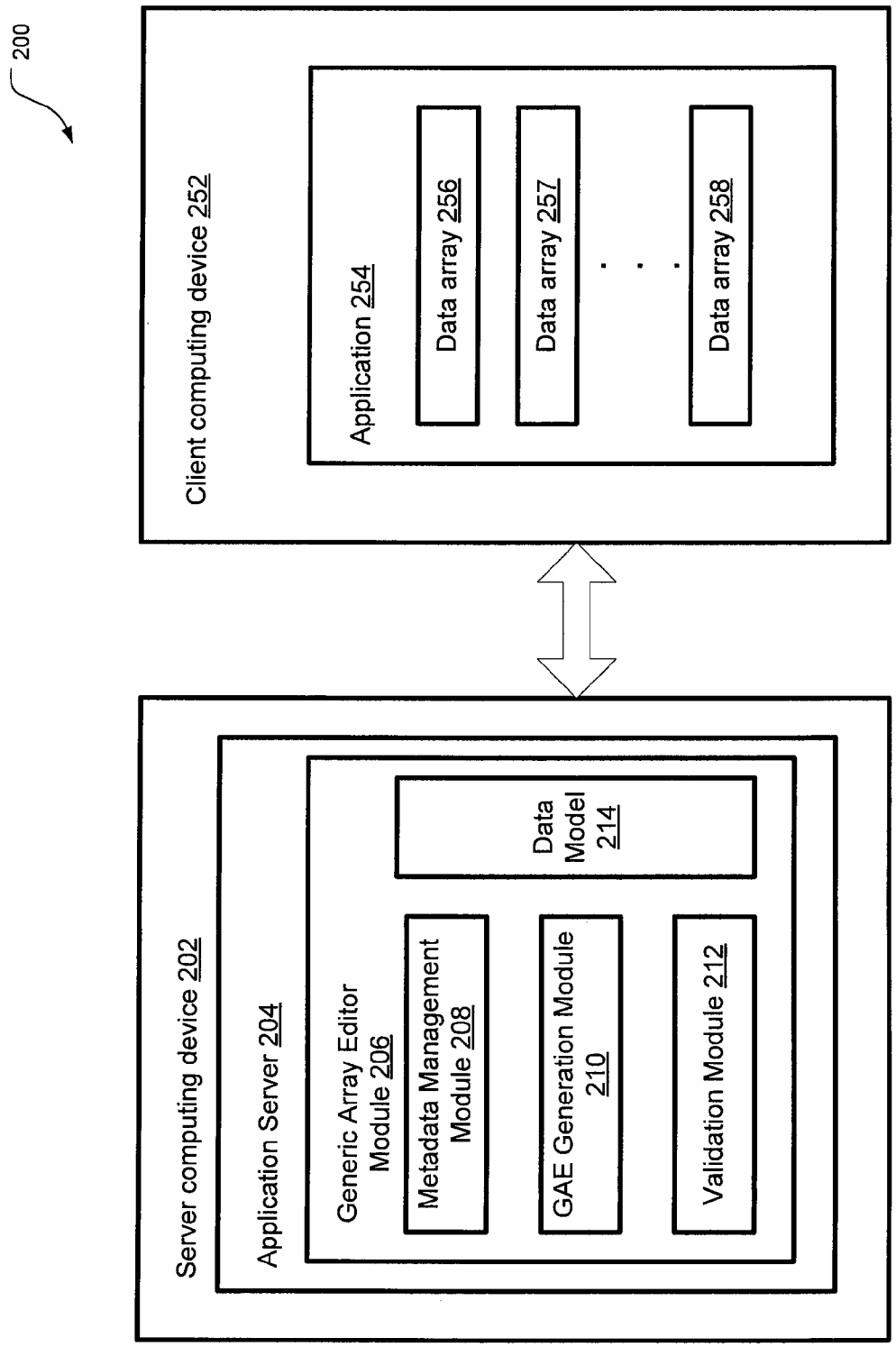
FIG. 2 depicts a block diagram of a system, in accordance with an example embodiment, for providing a generic array editor graphical user interface (GUI)

FIG. 2 depicts a block diagram of a system 200, in accordance with an example embodiment, for providing a generic array editor GUI. The system 200 includes a server computing device 202 in communication with a client computing device 252. The server computing device 202 may communicate with the client computing device 252 by way of a computer network, which is a collection of interconnected computing devices that communicate using wired or wireless media. Examples of computer networks include local area networks (LAN) and wide area networks (WAN), such as the Internet. In this example, the server computing device 202 hosts an application server 204, which is a server that is designed for or dedicated to running specific applications, such as the generic array editor module 206. Examples of the application server 204 include SAP NetWeaver Application Server, Advanced Business Application Programming (ABAP) Application Server, and Java Platform Enterprise Edition Server.

The client computing device 252 is configured to store and execute various applications, such as the application 254, that include modeling tools, enterprise services, report builders, and other applications. As depicted, the application 254 may include various data arrays 256-258. Alternatively, the data arrays 256-258 may be stored or located separately from the application 254. For example, the data arrays 256-258 may be stored in files separate from the application 254. Such files may be in the form of, for example, one or more documents, which refer to electronic media content that is accessible by computer technology. For example, a document can be a file that is not an executable file or a system file, and the document includes data (e.g., data arrays 256-258) for use by various applications. Examples of documents include word processing documents, report documents, spreadsheet documents, diagramming documents, and other documents.

The application server 204 runs the generic array editor module 206. The generic array editor module 206 may, for example, be a plug-in application that is integrated within an integrated development environment. As depicted in FIG. 2, the generic array editor module 206, in one embodiment, includes a metadata management module 208, a generic array editor generation module 210, a validation module 212, and a data model 214. The metadata management module 208, in general, accesses or retrieves the data arrays 256-258 from the application 254. After the data arrays 256-258 are accessed, the metadata management module 208 may identify the data types of the data arrays 256-258 and also the relationships amongst the different data arrays 256-258 based on the data types, as explained in more detail below.

The data model 214 is a logical representation of a hierarchical tree structure of the data arrays 256-258. As explained in more detail below, the hierarchical tree structure is constructed based on relationships amongst the different data arrays 256-258. The generic array editor generation module 210 generally creates or generates the GUI (e.g., the generic array editor GUI 104 depicted in FIG. 1) and, as explained in more detail below, displays an arrangement of the data arrays 256-258 based on the hierarchical tree structure. The validation module 212 validates modifications (e.g., adding and editing data arrays 256-258) made to the data arrays 256-258 before storing the modifications.

It should be appreciated that in other embodiments, the server computing device 202 and the client computing device 252 may include fewer, more, or different modules apart from those shown in FIG. 2. For example, in an alternate embodiment, the generic array editor module 206 is not hosted at the server computing device 202. Instead, the client computing device 252 executes the generic array editor module 206. For example, the generic array editor module 206 may be integrated into the application 254. In an alternate embodiment, the generic array editor module 206 may be hosted at a Web server, which hosts and serves Web pages to client computing devices, such as the client computing device 252. Examples of Web servers include Apache Hypertext Transfer Protocol (HTTP) server, Microsoft Internet Information Services, and SAP NetWeaver Application Server.

Figure 3:
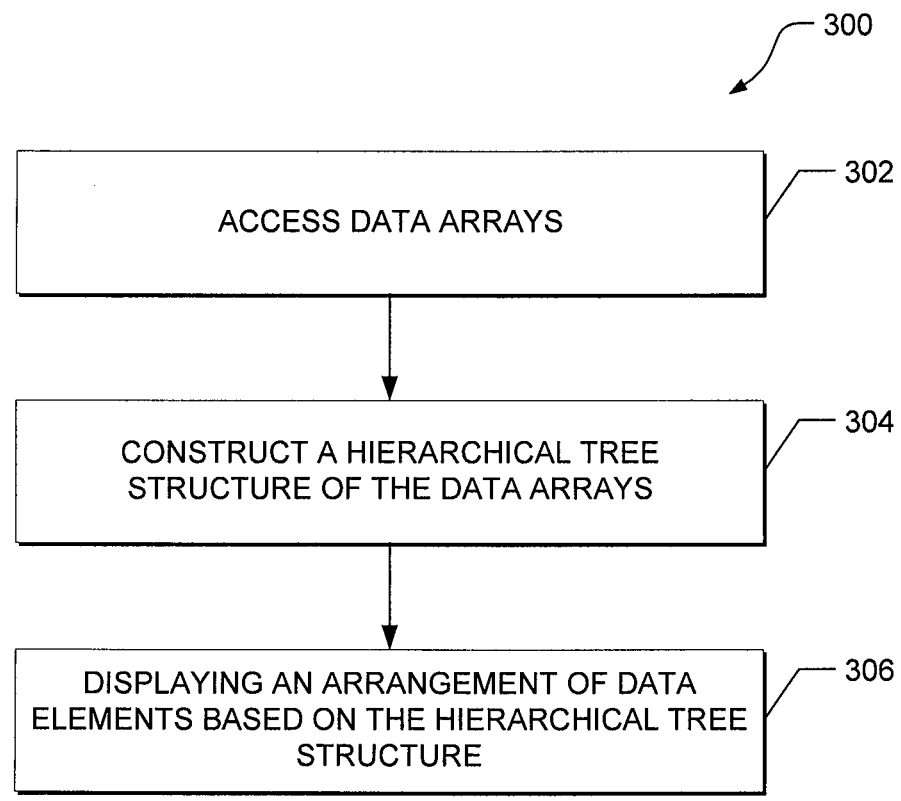
FIG. 3 depicts a flow diagram of a general overview of a method, in accordance with an example embodiment, for displaying data arrays in a GUI.

FIG. 3 depicts a flow diagram of a general overview of a method 300, in accordance with an example embodiment, for displaying data arrays in a GUI. The method 300, in one embodiment, may be implemented by the generic array editor module 206 and employed in the server computing device 202 of FIG. 2. As depicted in FIG. 3, one or more data arrays are accessed at 302. As discussed earlier, the data arrays may be accessed from applications or files.

It should be appreciated that a data array (as a whole), or each data element within a data array, is associated with a data type. As used herein, a "data type" refers to a classification identifying one of various kinds of data. Data types are used, for example, in computer programming, in which variables are created to store data. Each variable is assigned a data type that defines the type of data. All the data elements within a single data array may have the same data type. Alternatively, the data elements within a single data array may have different data types. The generic array editor module can support many or all of the different data types. For example, the generic array editor module can support primitive data types, which are predefined types of data supported by the programming language. For example, integer, character, float, long, Boolean, and string are all primitive data types.

In another example, the generic array editor module can also support composite data types, which refer to data types constructed from primitive data types, other composite data types, and/or data arrays. The following Table 1 provides an example of an object having a composite data type.

TABLE 1

```
Object CompositeType
{
    A: Type_A;
    B: Type_B;
    C: Type_C;
    ...
}
```

In Table 1, the object having the composite data type is comprised of three arrays, all having primitive data types, namely Type A, Type B, and Type C. Alternatively, one or more data types (Type A, Type B, and/or Type C) may also be a composite data type. Such a type of data array is referred to as a nested object array. The following Table 2 provides an example of a nested object array.

TABLE 2

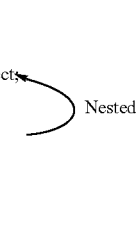

In Table 2, the object "NameObject" includes an array "name" having a string data type and a nested object array "nameFont," which has a composite data type that refers to or points to another object, "FontObject," which is also associated with a composite data type.

Still referring to FIG. 3, a hierarchical tree structure of the data arrays is then constructed at 304. A "hierarchical tree structure," as used herein, is a data structure that defines a ranking of data arrays (or data elements of the data arrays) relative to each other. In one embodiment, the ranking is based on the relationships defined by the data types associated with the data arrays. For example, data arrays having primitive data types may be ranked equally in the hierarchical tree structure. However, data arrays that are nested in other data arrays may be ranked lower in the hierarchical tree structure.

After the hierarchical tree structure is constructed, an arrangement of the data elements is displayed at 306 in a GUI. This arrangement is based on the constructed hierarchical tree structure. As illustrated in more detail below, the ranking of the data arrays as defined in the hierarchical tree structure may result in an arrangement of the data elements, as displayed in the GUI, that, for example, is more intuitive, logical, and easier to understand. Additionally, the arrangement may also facilitate the viewing of the data arrays relative to each other in that a user can expand the display of some data arrays in detail while hiding or collapsing certain displays of data arrays such that the GUI does not display, for example, unnecessary information.

Figure 4A:
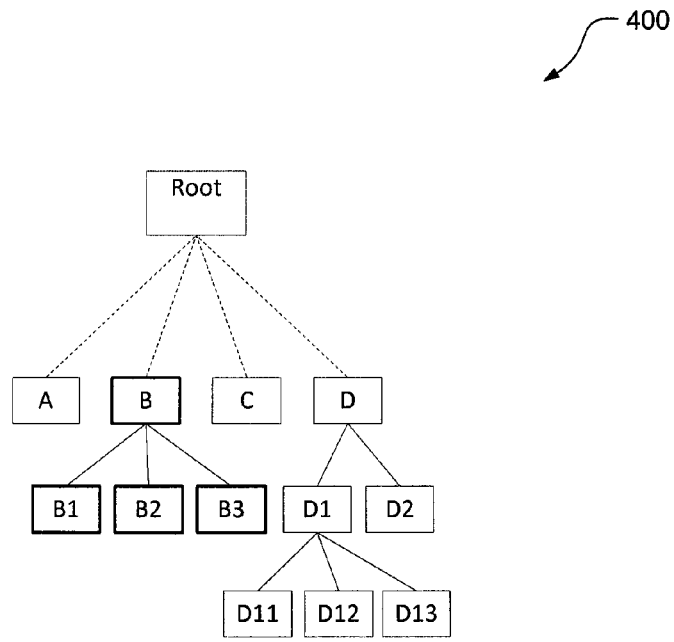
FIG. 4A depicts a block diagram of a hierarchical tree structure of data arrays, consistent with an embodiment of the present invention.

FIG. 4A depicts a block diagram of a hierarchical tree structure 400 of data arrays, consistent with an embodiment of the present invention. The example of the hierarchical tree structure 400 includes multiple nodes A-D, B1-B3, D1-D2, and D11-D13, which may be identified as parent nodes, child nodes, and leaf nodes. A parent node has a branch underneath itself, while a child node has at least one branch directly above itself. In the hierarchical tree structure 400, a parent node is ranked higher than a child node. The relationships between the nodes A-D, B1-B3, D1-D2, and D11-D13 are thus defined by branches connecting the nodes A-D, B1-B3, D1-D2, and D11-D13. Each node A, B, C, D, B1, B2, B3, D1, D2, D11, D12, or D13 of the hierarchical tree structure 400 represents either a data array or a data element of the data array.

As discussed above, each node A, B, C, D, B1, B2, B3, D1, D2, D11, D12, or D13 is ranked relative to each other based on, for example, the associated data types. In this hierarchical tree structure 400, the "root" node is ranked higher than nodes A-D. Nodes B1-B3 are ranked lower than node B because, for example, node B is a nested object array and nodes B1-B3 are nested in node B. Similarly, nodes D1-D2 are ranked lower than node D because, for example, node D is also a nested object array. For the same reason, nodes D11-D13 are ranked lower than node D1. It should be appreciated that nodes B1-B3 and nodes D11-D13 are referred to as leaf nodes, which are nodes furthest from the "root" node that do not have a child node. In many examples, the leaf nodes B1-B3 and nodes D11-D13 represent the data elements of one or more data arrays.

Figure 4B:
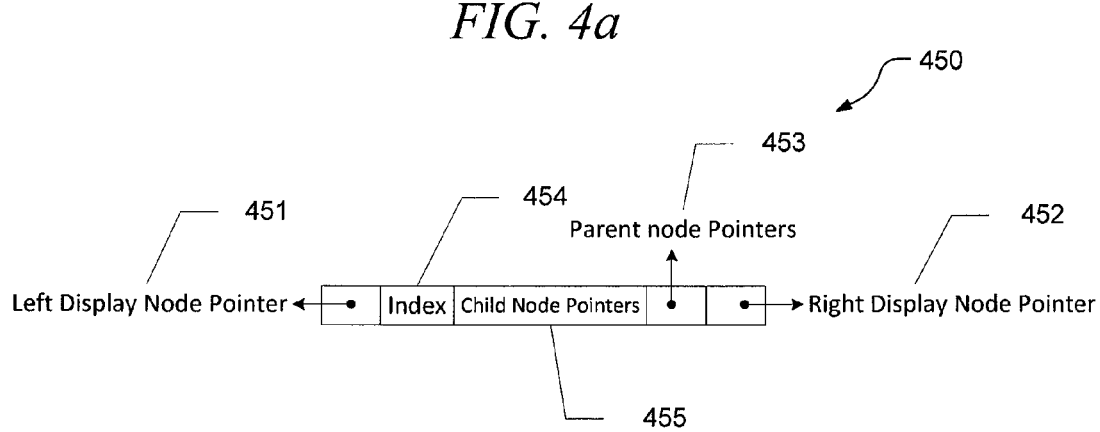
FIG. 4B depicts a block diagram of a data structure of a node, in accordance with an example embodiment.

FIG. 4B depicts a block diagram of a data structure of a node 450, in accordance with an example embodiment. As depicted in FIG. 4B, the data structure of the node 450 may include a left display node pointer 451, an index 454, child node pointers 455, parent node pointers 453, and a right display node pointer 452. The left display node pointer 451 is a pointer to another node to the left of the node 450. As explained in more detail below, this left display node pointer 451 is referred to when displaying the data elements or data arrays. On the other hand, the right display node pointer 452 is a pointer to another node to the right of the node 450 and, as explained in more detail below, this right display node pointer 452 is referred to when displaying the data elements or data arrays.

The index 454 is a value (e.g., integer value) that identifies the display order of this particular node 450. An index 454 with a value of 2, for example, may indicate that the particular node 450 is displayed right next to another node with an index value of 1. The child node pointers 455 include one or more pointers to child nodes. Similarly, the parent node pointers 453 include one or more pointers to parent nodes. It should be appreciated that any one of the nodes A, B, C, D, B1, B2, B3, D1, D2, D11, D12, or D13 depicted in FIG. 4A may have the same data structure as the node 450 depicted in FIG. 4B. Accordingly, by relating each node to other nodes as defined in the data structure of FIG. 4B, a complete hierarchical tree structure may be constructed.

Figures 5A, 5B:
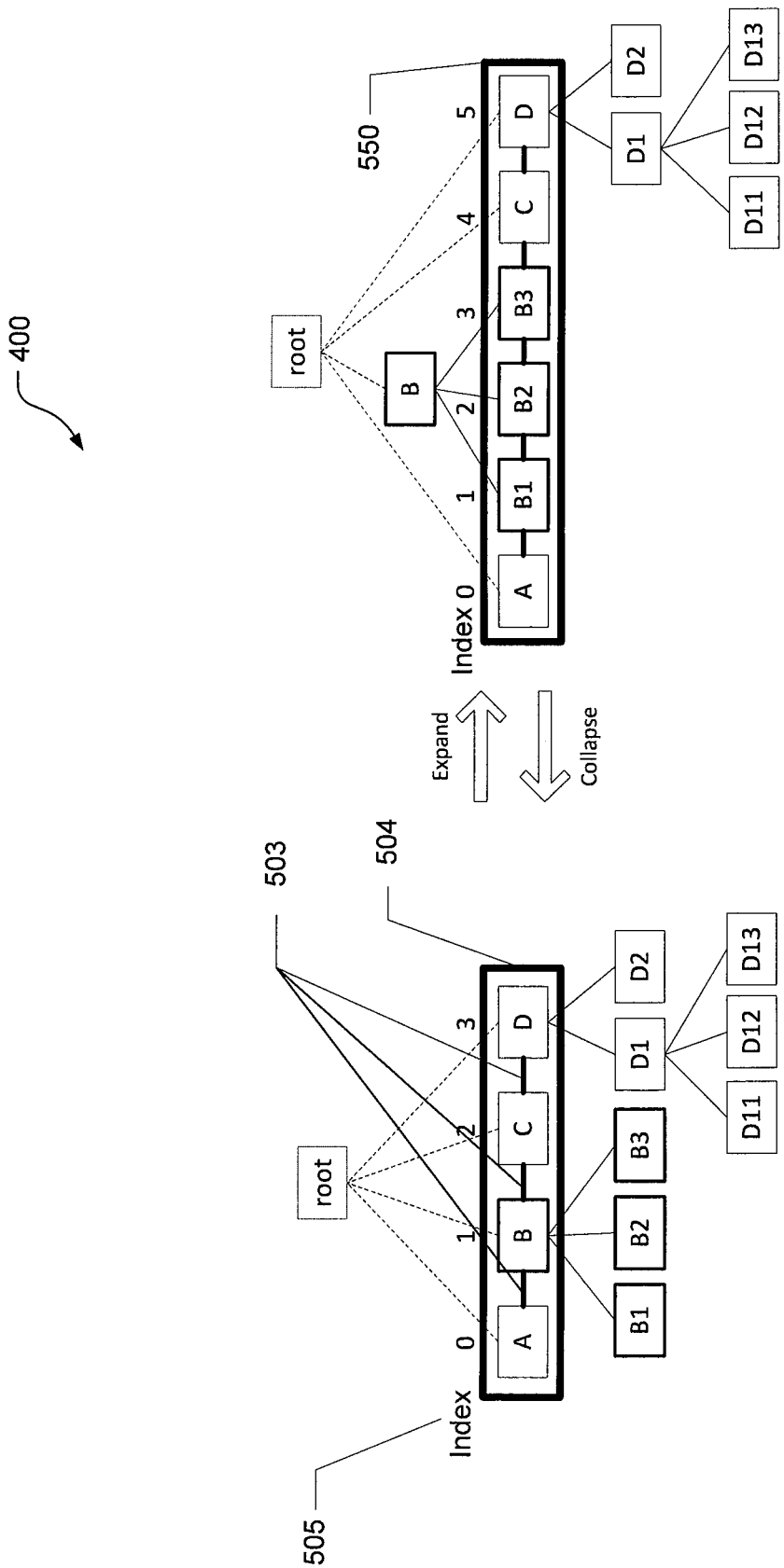
FIGS. 5A and 5B depict block diagrams illustrating the expansion and collapse of nodes within a hierarchical tree structure, consistent with an example embodiment.

FIGS. 5A and 5B depict block diagrams illustrating the expansion and collapse of nodes within a hierarchical tree structure 400, consistent with an example embodiment. When the data elements are displayed at a GUI, a user may want to conceal certain data elements when, for example, a display of all the data elements of all arrays may be too overwhelming or difficult to read. In other instances, a user may want to expand or display particular arrays in detail to see or edit, for example, all their data elements. Embodiments of the present invention can expand or collapse certain data arrays or data elements based on the relationships defined in the hierarchical tree structure.

As depicted in FIG. 5A, the rectangular region 504 identifies all the nodes that are to be displayed in a GUI. In particular, the rectangular region 504 encompasses nodes A-D, thereby indicating that graphical representations of data arrays and/or data elements associated with nodes A-D are displayed in the GUI. Nodes B1-B3, D11-D13, and the "root" node are not displayed in the GUI. The index 505 identifies a display order of the nodes A-D on, for example, a graphical data grid. For example, nodes A-D may be displayed from left to right along a row where node A (index 0) is placed left of nodes B-D, node B (index 1) is placed left of nodes C-D, and node C (index 2) is placed left of node D (index 3). In another example, nodes A-D may be displayed from top to bottom along a column where node A (index 0) is placed above nodes B-D, node B (index 1) is placed above nodes C-D, and node C (index 2) is placed above node D (index 3). The horizontal lines 503 show linking of the nodes A-D as defined or identified by the left display node pointer(s) and/or the right display node pointer(s), which are defined in nodes A-D.

In this example, a user may want to further expand the view of node B. Node B may represent a data array, and a user may want to view or display the data elements of the data array, as represented by nodes B1-B3. Here, the generic array editor module may receive a request to expand a display of the data array associated with node B. The expansion is illustrated in FIG. 5B where the rectangular region 550 encompasses nodes A, B1-B3, C, and D, thereby identifying graphical representations of data arrays and/or data elements associated with these nodes A, B1-B3, C, and D, which are displayed in the GUI. Nodes B, D1-D2, D11-D13, and the "root" node are not displayed in a GUI because, according to the hierarchical tree structure 400, these nodes are not child nodes of node B. For example, these nodes B, D1-D2, D11-D13, and the "root" node are not nested in node B.

Vice versa, the user may then collapse a display of the data array associated with node B. This collapse is illustrated in the transition from FIG. 5B to FIG. 5A. In this example, the generic array editor module may receive another request to collapse a display of the array associated with node B. As a result, as illustrated in FIG. 5A, the parent node B of nodes B1-B3 is identified from the hierarchical tree structure 400 and again, as indicated by the rectangular region 504, nodes A-D are displayed in the GUI. As a result, the data elements represented by nodes B1-B3 are concealed in the GUI.

Figures 6A, 6B:
FIGS. 6A and 6B depict graphical user interface diagrams, consistent with an example embodiment, illustrating the expansion and collapse of data arrays and data elements.

FIGS. 6A and 6B depict graphical user interface diagrams, consistent with an example embodiment, illustrating the expansion and collapse of data arrays and data elements. As depicted in FIG. 6A, the generic array editor module may generate a GUI 602 that displays data elements associated with multiple data arrays. One of the arrays, namely "Array 1," is a nested object array where its structure is depicted previously in Table 2. In this example, the "Array 1" data array has a composite data type that includes names of objects (or array "name") and various details about fonts associated with the objects. The arrangement of the data elements, as displayed, is based on a hierarchical tree structure. For example, as depicted in FIG. 6A, "Array 1," "Array 2," and "Array 3" data arrays are ranked equally in the hierarchical tree structure. Accordingly, the GUI 602 displays data elements of the data arrays (e.g., object name, font type, hidden check, dates) side-by-side.

However, the GUI 602 only displays the names of the objects (e.g., Name1, . . . , Name5) and the font family (e.g., Verdana) associated with each named object. A user viewing GUI 602 may want to display more details about the particular font assigned to each named object. Accordingly, the user may select the "+" button region 651 to expand more details about the fonts. As a result, as depicted in FIG. 6B, the GUI 602' displays further details about each font, such as the font size and font color. The arrangement of the expanded data elements are also based on the hierarchical tree structure.

After the expansion, the user may then collapse a display of the font details, and this collapse is illustrated in the transition from FIG. 6B to FIG. 6A. Here, the user viewing the GUI 602' may select or click on the "−" button region 652 to collapse the display of font details. As a result, as depicted in FIG. 6A, details about the font size and font colors are concealed in the same GUI 602. It should be noted that GUI 602 still displays one of the font details, namely the font family, upon collapse. The font family is displayed because, in this example, the particular layout GUI 602 still has space to accommodate a column of data even upon collapse. However, in an alternate GUI layout, all the font details (e.g., font family, font size, and font color) may be concealed upon collapse.

It should be appreciated that a number of suitable layouts can be designed for region layouts illustrated above, as FIGS. 1, 6A, and 6B do not represent all possible layout options available. The displayable appearance of the regions can be defined by any suitable geometric shape, alphanumeric character, symbol, shading, pattern, and color. Furthermore, for example, the "+" button region 651 depicted in FIG. 6A, or any other region, may be omitted or dynamically assigned. It should also be appreciated that the regions can be fixed or customizable. Additionally, the computing devices may have a fixed set of layouts, utilize a defined protocol or language to define the layout, or an external structure can be reported to the computing device that defines the layout. Finally, clicking on the region of GUI as discussed above may trigger code to cause the functionality described herein, such as expanding or collapsing displays of data arrays and/or data elements.

Figure 7:
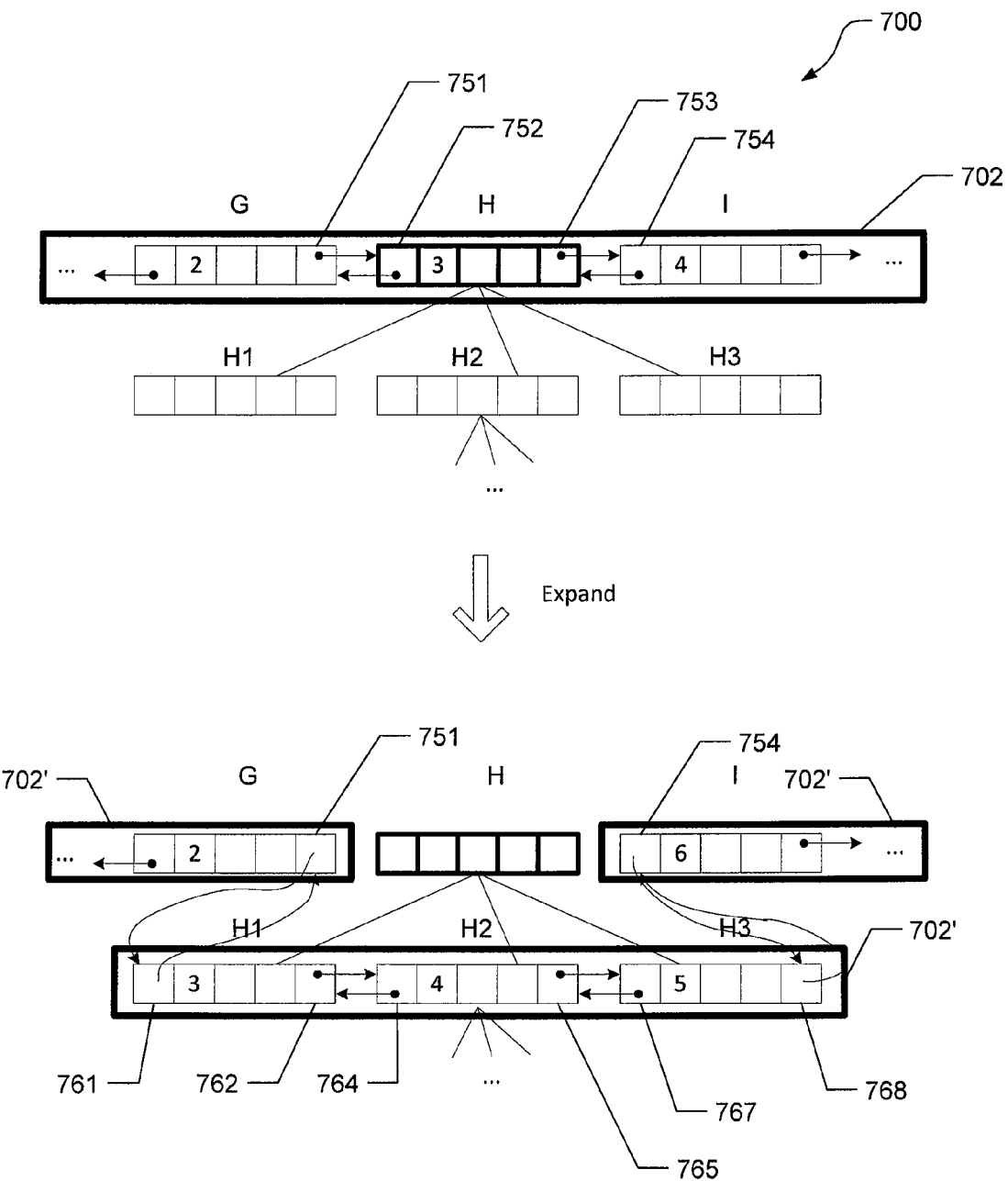
FIG. 7 depicts a block diagram illustrating a detailed expansion of nodes in a hierarchical tree structure, in accordance with an example embodiment.

FIG. 7 depicts a block diagram illustrating a detailed expansion of nodes in a hierarchical tree structure 700, in accordance with an example embodiment. The hierarchical tree structure 700 includes nodes G, H, I, and H1-H3, where nodes H1-H3 are nested in node H. Additionally illustrated are the data structures associated with each node G, H, I, H1, H2, and H3, where each node includes, for example, the index, left display node pointers 752, 754, 761, 764, and 767, and right display node pointers 751, 753, 762, 765, and 768.

The rectangular region 702 identifies the nodes G, H, and I that are displayed at a GUI. In this example, the right display node pointer 751 of node G points to node H and, vice versa, the left display node pointer 752 of node H points to node G. Similarly, the right display node pointer 753 of node H points to node I and, vice versa, the left display node pointer 754 of node I points to node H.

In this example, a user may request the expansion of node H. Accordingly, the generic array editor module locates the child nodes H1-H3 of node H from the hierarchical tree structure 700. The child nodes H1-H3 then become the new display nodes, and the index is updated accordingly. In general, the link chain (or the link from left to right for each node) is updated to lift up all the child nodes H1-H3. Particularly, the first child node H1 becomes the right display node of the left node G and the last child node H3 becomes the left display node of the right node I. The index of the displayed nodes G, H1, H2, H3, and I are then recalculated.

In particular, as depicted in FIG. 7, upon expansion, the right display node pointer 751 of node G is updated to point to node H1 and vice versa, the left display node pointer 761 of node H1 is updated to point to node G. Similarly, the left display node pointer 754 of node I is updated to point to node H3 and vice versa, the right display node pointer 768 of node H3 now points to node I. Furthermore, the right display node pointer 762 of node H1 is updated to point to node H2 and vice versa, the left display node pointer 764 of node H2 is updated to point to node H1. The right display node pointer 765 of node H2 is also updated to point to node H3 and vice versa, the left display node pointer 767 of node H3 is updated to point to node H2. As a result, upon expansion, as depicted by rectangular regions 702', nodes G, H1-H3, and I are displayed in the GUI.

Figure 8:
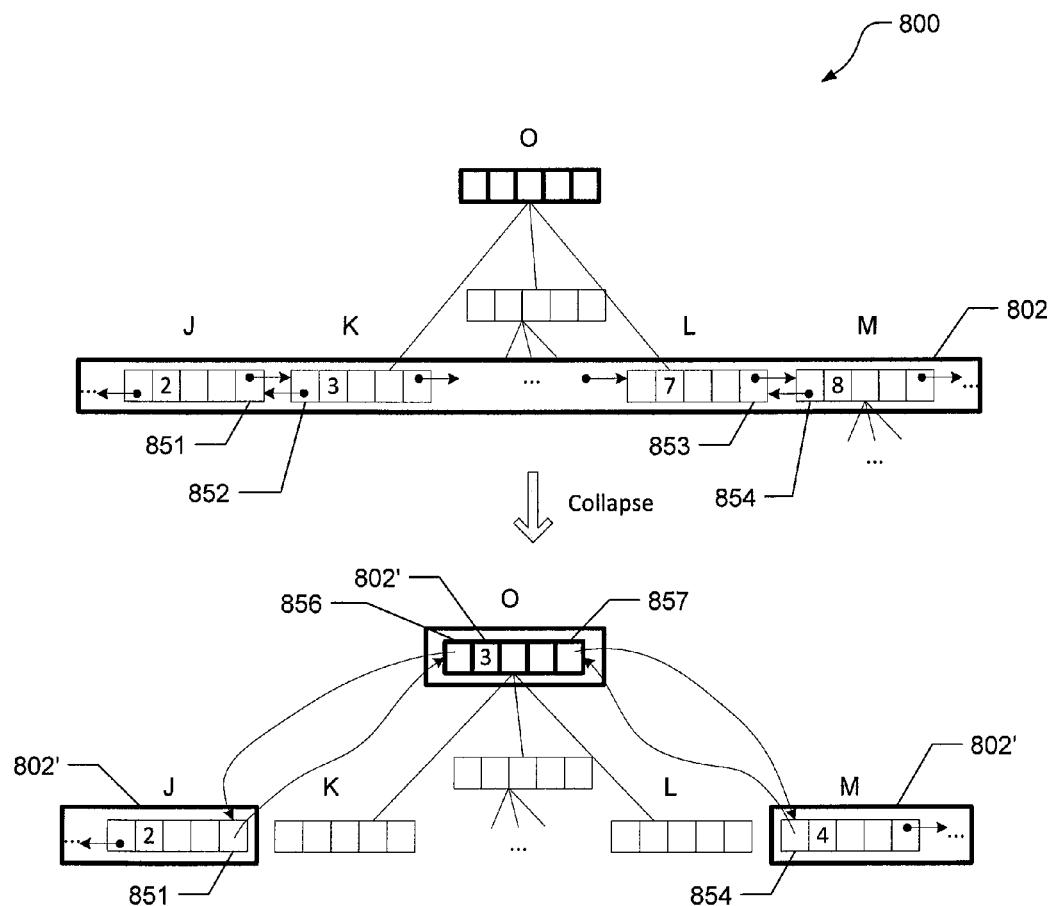
FIG. 8 depicts a block diagram illustrating a detailed collapse of nodes in a hierarchical tree structure, in accordance with an example embodiment.

FIG. 8 depicts a block diagram illustrating a detailed collapse of nodes in a hierarchical tree structure 800, in accordance with an example embodiment. The hierarchical tree structure 800 includes nodes O, J, K, L, and M, where nodes K-L are child nodes of, or nested in, node O. Additionally illustrated are the data structures associated with each node O, J, K, L, or M, where each node includes, for example, an index, left display node pointers 852, 854, and 856, and right display node pointers 851, 853, and 857.

The rectangular region 802 identifies the nodes J, K, L, and M that are displayed in a GUI. In the example depicted in FIG. 8, a user may request the collapse of node O. It should be noted that when a node is collapsed, its child nodes are collapsed first, and then the node itself becomes the displayed node. For example, all the child nodes K-L of node O are collapsed. The node O now becomes the new displayed node instead of all its child nodes K-L. The indexes of the displayed nodes K-L are then updated or recalculated where, for example, the index of all right nodes can be subtracted from a number of the child nodes K-L.

In particular, as depicted in FIG. 8, upon collapse, the right display node pointer 851 of node J is updated to point to node O, and vice versa, the left display node pointer 856 of node O is updated to point to node J. Similarly, the left display node pointer 854 of node M is updated to point to node O and vice versa, the right display node pointer 857 of node O now points to node M. As a result of the collapse, as depicted by the rectangular regions 802', nodes J, O, and M are displayed in the GUI.

Figure 9:
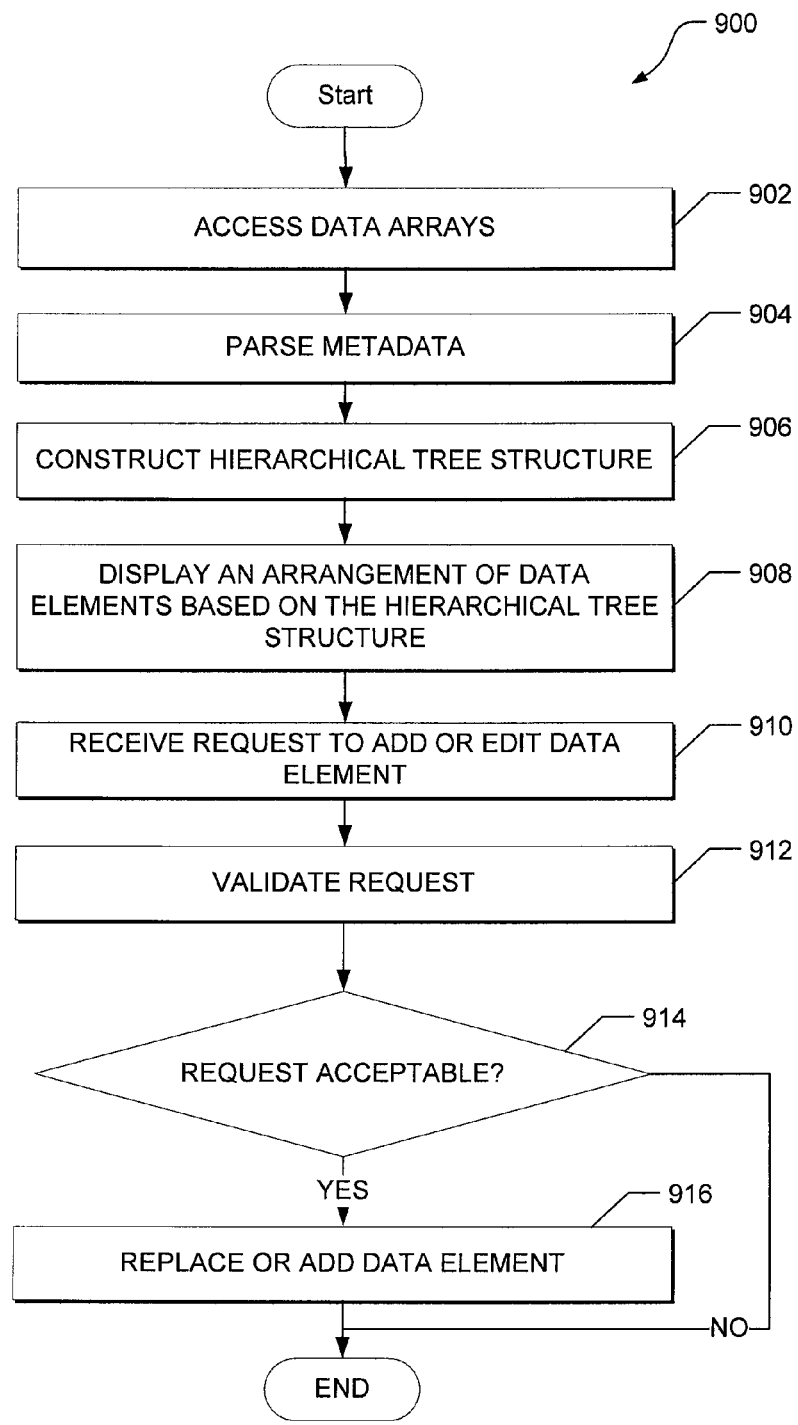
FIG. 9 depicts a flow diagram of a detailed method, in accordance with an example embodiment, for displaying and modifying data arrays.

FIG. 9 depicts a flow diagram of a detailed method, in accordance with an example embodiment, for displaying and modifying data arrays. In an example embodiment, the method 900 may be implemented by the generic array editor module 206 and employed in the server computing device 202 of FIG. 2. As depicted in FIG. 9, one or more data arrays are accessed at 902. In addition, metadata associated with the construction of the GUI and/or the hierarchical tree structure is accessed and parsed at 904. For example, all the various data types associated with the data arrays and user preference data are examples of metadata.

In one embodiment, user preference data may include user-defined GUIs (e.g., graphical gauge control) for the different data types. A user may assign or define particular GUIs in the form of graphical gauge controls to each data type, and these graphical gauge controls are displayed in the generic array editor GUI. The data elements are displayed in the context of the graphical gauge controls. It should be noted that such metadata defining the user-defined GUIs may be stored in a file, such as an eXtensible markup language (XML) file. FIG. 10 depicts a table 1100 listing examples of the different user-defined GUIs in the form of graphical gauge controls that may be assigned to the different data types.

Referring to FIG. 9, the hierarchical tree structure is constructed at 906, and an arrangement of data elements and data arrays are displayed in the generic array editor GUI based on the hierarchical tree structure at 908. As discussed above, the hierarchical tree structure is constructed from an analysis of the relationships between the different data types associated with the data arrays.

At 910, the generic array editor module receives a request to modify a value of a data element. For example, a user may add a new data element to an existing data array. In another example, a user may edit an existing data element through the generic array editor GUI. In accordance to an example embodiment, the request may be validated at 912 after receipt. Here, the validation may, for example, be based on verifying the data type of the received data element to conform to the original data type associated with the data array. That is, the received data element may be checked to identify whether it conforms to the data type defined in the array.

For example, a user may edit an existing data element. The data type associated with this existing data element may be a date data type. Validation may be in the form of checking to identify whether the received data element conforms to the date data type. If the user modifies or inputs a value that is not in the form of a date, such as a string of characters (e.g., "mouse"), then the validation may indicate an invalid input. On the other hand, if the user modifies or inputs a value that conforms to the date data type (e.g., "Oct. 1, 2009"), then the validation indicates a valid input. In another example, a user may add a new data element to an existing data array. The data type associated with this particular data array may, similarly, be a date data type. Here, validation may be in the form of checking to identify whether the data type of the new data element conforms to the date data type, as discussed above.

As depicted in 914, if the validation identifies the received data element in the request as being not acceptable or invalid, then this received data element is discarded and not saved to the data array. On the other hand, if the validation identifies that the request is acceptable or valid, then the received data element is added to the data array or replaces an existing data element of the data array at 916.

Figure 11:
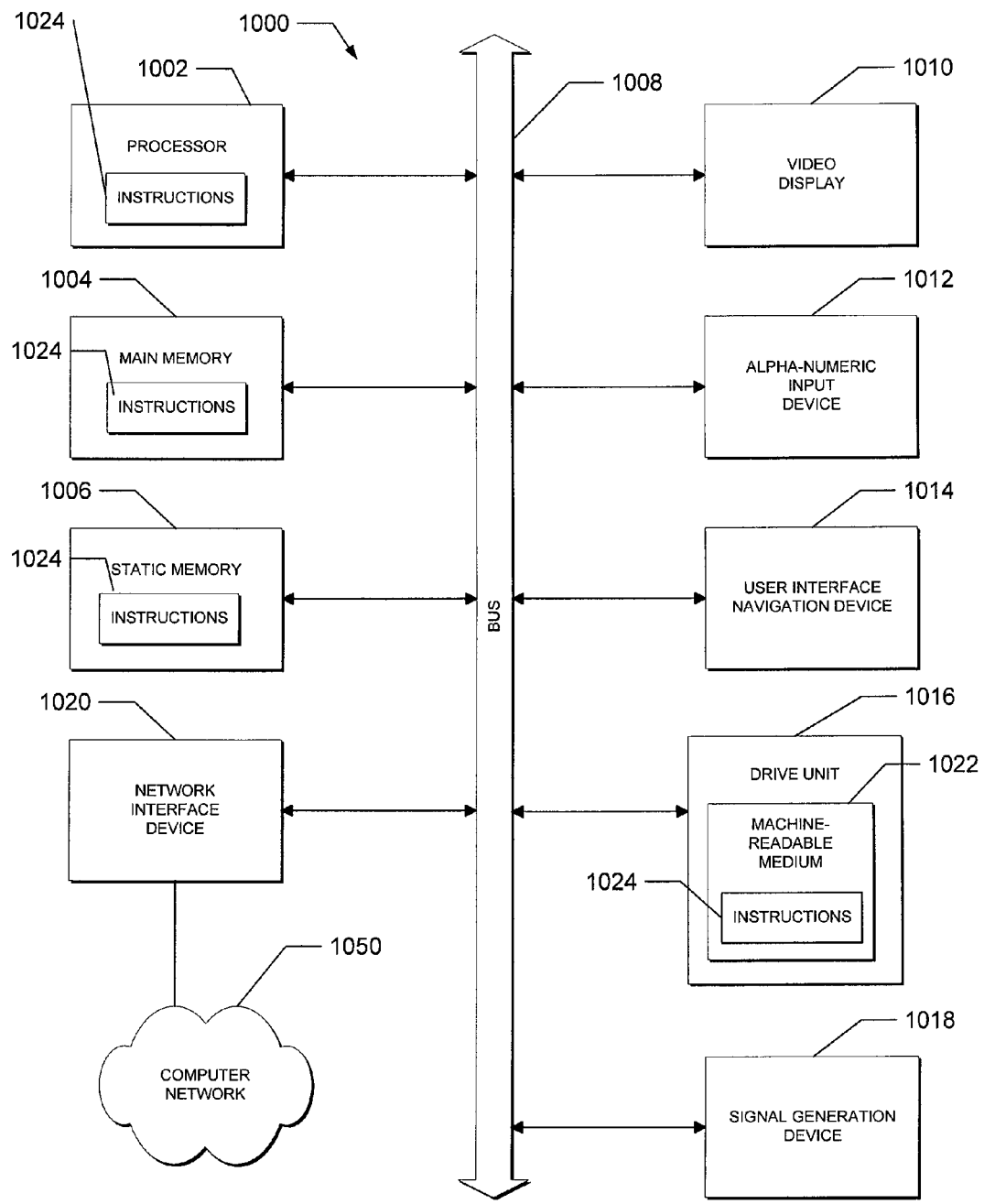
FIG. 11 depicts a block diagram of a machine in the example form of a computing device within which may be executed a set of instructions for causing the machine to perform any one or more of the methodologies discussed herein.

FIG. 11 depicts a block diagram of a machine in the example form of a computing device 1000 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Embodiments may also, for example, be deployed by Software-as-a-Service (SaaS), Application Service Provider (ASP), or utility computing providers, in addition to being sold or licensed via traditional channels.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 1000 includes a processor 1002 (e.g., a central processing unit (CPU), a graphics processing unit (GPU) or both), a main memory 1004 (e.g., random access memory (a type of volatile memory)), and static memory 1006 (e.g., static random-access memory (a type of volatile memory)), which communicate with each other via bus 1008. The computing device 1000 may further include video display unit 1010 (e.g., a plasma display, a liquid crystal display (LCD) or a cathode ray tube (CRT)). The computing device 1000 also includes an alphanumeric input device 1012 (e.g., a keyboard), a user interface (UI) navigation device 1014 (e.g., a mouse), a disk drive unit 1016, a signal generation device 1018 (e.g., a speaker), and a network interface device 1020.

The disk drive unit 1016 (a type of non-volatile memory storage) includes a machine-readable medium 1022 on which is stored one or more sets of data structures and instructions 1024 (e.g., software) embodying or utilized by any one or more of the methodologies or functions described herein. The data structures and instructions 1024 may also reside, completely or at least partially, within the main memory 1004 and/or within the processor 1002 during execution thereof by computing device 1000, with the main memory 1004 and processor 1002 also constituting machine-readable, tangible media.

The data structures and instructions 1024 may further be transmitted or received over a computer network 1050 via network interface device 1020 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 1000) or one or more hardware modules of a computer system (e.g., a processor 1002 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 1002 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1002 configured using software, the general-purpose processor 1002 may be configured as respective different hardware modules at different times. Software may accordingly configure a processor 1002, for example, to constitute a particular hardware module at one instance of time and to constitute a different hardware module at a different instance of time.

Modules can provide information to, and receive information from, other hardware modules. For example, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 1002 that are temporarily configured (e.g., by software) or permanently configured to perform the relevant operations. Whether temporarily or permanently configured, such processors 1002 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1002 or processor-implemented modules. The performance of certain of the operations may be distributed among the one or more processors 1002, not only residing within a single machine, but deployed across a number of machines. In some example embodiments, the processor or processors 1002 may be located in a single location (e.g., within a home environment, an office environment or as a server farm), while in other embodiments the processors 1002 may be distributed across a number of locations.

While the embodiment(s) is (are) described with reference to various implementations and exploitations, it will be understood that these embodiments are illustrative and that the scope of the embodiment(s) is not limited to them. In general, techniques displaying and modifying data arrays may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of displaying a plurality of data arrays in a graphical user interface, the method comprising:

accessing a first data array and a second data array that is nested in the first data array, the first data array comprising a plurality of first data elements, the second data array comprising a plurality of second data elements;

constructing a hierarchical tree structure of the plurality of first and second data arrays, the first data array being ranked higher than the second data array in the hierarchical tree structure based on nesting of the second data array in the first data array; and displaying an arrangement of the plurality of first and second data elements in the graphical user interface, the arrangement being based on the hierarchical tree structure, the arrangement expandable to display one or more of the plurality of second data elements within a same tree structure level of the plurality of first data elements, the arrangement comprising a replacement of one or more of the plurality of first data elements with one or more of the plurality of second data elements after an expansion of the expandable arrangement and omitting an identification of the one or more replaced first data elements in the same tree structure level of the replaced first plurality of first data elements, and collapsible to hide the one or more of the plurality of second data elements from the same tree structure level of the plurality of first data elements.

2. The method of claim 1, wherein the first data array is associated with a composite data type.

3. The method of claim 1, wherein the first data array is a nested object array.

4. The method of claim 1, further comprising:
receiving a request to edit a data element from the plurality of first data elements to a different data element, the different data element being associated with a data type;
validating the different data element based on the data type; and
replacing the data element with the different data element based on the validation.

5. The method of claim 1. wherein the hierarchical tree structure includes a plurality of nodes, a node from the plurality of nodes representing the first data array or the second data array.

6. The method of claim 5, wherein the plurality of nodes includes a plurality of leaf nodes that represent the plurality of first data elements and the plurality of second data elements.

7. The method of claim 1, further comprising:
receiving a request to collapse a display of the second data array; and
concealing a data element from the plurality of second data elements in the graphical user interface.

8. The method of claim 1, further comprising:
accessing a third data array that is nested in the second data array, the third data array comprising a plurality of third data elements;
receiving a request to expand a display of the third data array; and
displaying the arrangement with the plurality of the third data elements in the graphical user interface,
wherein the constructing of the hierarchical tree structure comprises constructing the hierarchical tree structure of the plurality of first, second, and third data arrays, the second data array being ranked higher than the third data array in the hierarchical tree structure based on nesting of the third data array in the second data array, the arrangement being based on the hierarchical tree structure.

9. A non-transitory machine-readable medium that stores instructions, which, when performed by a machine, cause the machine to perform operations comprising:
accessing a first data array and a second data array that is nested in the first data array, the first data array comprising a plurality of first data elements, the second data array comprising a plurality of second data elements;
constructing a hierarchical tree structure of the plurality of first and second data arrays, the first data array being ranked higher than the second data array in the hierarchical tree structure based on nesting of the second data array in the first data array; and
displaying an arrangement of the plurality of first and second data elements in a graphical user interface, the arrangement being based on the hierarchical tree structure, the arrangement expandable to display one or more of the plurality of second data elements within a same tree structure level of the plurality of first data elements, the arrangement comprising a replacement of one or more of the plurality of first data elements with one or more of the plurality of second data elements after an expansion of the expandable arrangement and omitting an identification of the one or more replaced first data elements in the same tree structure level of the replaced first plurality of first data elements, and collapsible to hide the one or more of the plurality of second data elements from the same tree structure level of the plurality of first data element.

10. The non-transitory machine-readable medium of claim 9, wherein the first data array and the second data array are accessed from a document.

11. The non-transitory machine-readable medium of claim 9, wherein the plurality of data elements is associated with a plurality of data types, each data element in the plurality of first and second data elements is associated with a data type from the plurality of data types,
the method further comprising accessing metadata that defines a plurality of user-defined graphical user interfaces associated with the plurality of data types,
wherein the displaying of the arrangement comprises displaying the plurality of first and second data elements in a context of the plurality of user-defined graphical user interfaces.

12. The non-transitory machine-readable medium of claim 11, wherein the metadata is included in an eXtensible Markup Language (XML) file.

13. The non-transitory machine-readable medium of claim 9, the operations further comprising:
receiving a request to collapse a display of the second data array; and
concealing a data element from the plurality of second data elements in the graphical user interface.

14. The non-transitory machine-readable medium of claim 9, the operations further comprising:
accessing a third data array that is nested in the second data array, the third data array comprising a plurality of third data elements;
receiving a request to expand a display of the third data array; and
displaying the arrangement with the plurality of the third data elements in the graphical user interface,
wherein the constructing of the hierarchical tree structure comprises constructing the hierarchical tree structure of the plurality of first, second, and third data arrays, the second data array being ranked higher than the third data array in the hierarchical tree structure based on nesting of the third data array in the second data array, the arrangement being based on the hierarchical tree structure.

15. A computing device comprising:
at least one processor; and
a memory in communication with the at least one processor, the memory being configured to store a metadata management module and a graphical user interface generation module that are executable by the at least one processor,
the metadata management module having instructions that, when executed by the at least one processor, cause operations to be performed, the operations comprising:
accessing a first data array and a second data array that is nested in the first data array, the first data array comprising a plurality of first data elements, the second data array comprising a plurality of second data elements; and constructing a hierarchical tree structure of the plurality of first and second data arrays, the first data array being ranked higher than the second data array in the hierarchical tree structure based on nesting of the second data array in the first data array, the graphical user interface generation module having instructions that, when executed by the at least one processor, cause operations to be performed, the operations comprising displaying an arrangement of the plurality of first and second data elements in a graphical user interface, the arrangement being based on the hierarchical tree structure, the arrangement expandable to display one or more of the plurality of second data elements within a same tree structure level of the plurality of first data elements, the arrangement comprising a replacement of one or more of the plurality of first data elements with one or more of the plurality of second data elements after an expansion of the expandable arrangement and omitting an identification of the one or more replaced first data elements in the same tree structure level of the replaced first plurality of first data elements, and collapsible to hide the one or more of the plurality of second data elements from the same tree structure level of the plurality of first data element.

16. The computing device of claim 15, wherein the memory is further configured to store a validation module, the validation module having instructions that, when executed by the at least one processor, cause operations to be performed, the operations comprising:

receiving a request to add a new data element to the first data array, the new data element being associated with a new data type;

validating the new data element based on the new data type; and adding the new data element to the first data array based on the validation.

17. The computing device of claim 15, wherein the graphical user interface generation module has instructions that, when executed by the at least one processor, cause further operations to be performed, the further operations comprising:

receiving a request to collapse a display of the second data array; and concealing a data element from the plurality of second data elements in the graphical user interface.

18. The computing device of claim 15, wherein the graphical user interface generation module has instructions that, when executed by the at least one processor, cause further operations to be performed, the further operations comprising:

accessing a third data array that is nested in the second data array, the third data array comprising a plurality of third data elements;

receiving a request to expand a display of the third data array; and displaying the arrangement with the plurality of the third data elements in the graphical user interface, wherein the operation of constructing the hierarchical tree structure comprises constructing the hierarchical tree structure of the plurality of first, second, and third data arrays, the second data array being ranked higher than the third data array in the hierarchical tree structure based on nesting of the third data array in the second data array, the arrangement being based on the hierarchical tree structure.

19. The computing device of claim 15, wherein the hierarchical tree structure includes a plurality of nodes, a node from the plurality of nodes representing the first data array or the second data array.

20. The computing device of claim 19, wherein the plurality of nodes includes a plurality of leaf nodes that represent the plurality of first elements and the plurality of second elements.

* * * * *